(12) United States Patent
Yamazaki et al.

(10) Patent No.: US 11,232,706 B2
(45) Date of Patent: Jan. 25, 2022

(54) TRAFFIC SIGNAL CONTROL APPARATUS, TRAFFIC SIGNAL CONTROL METHOD, AND COMPUTER PROGRAM

(71) Applicant: SUMITOMO ELECTRIC INDUSTRIES, LTD., Osaka (JP)

(72) Inventors: Nobuhiro Yamazaki, Osaka (JP); Hajime Sakakibara, Osaka (JP); Arata Doi, Osaka (JP); Hiroshi Matsumoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/969,501

(22) PCT Filed: Dec. 12, 2018

(86) PCT No.: PCT/JP2018/045656
§ 371 (c)(1),
(2) Date: Aug. 12, 2020

(87) PCT Pub. No.: WO2019/163261
PCT Pub. Date: Aug. 29, 2019

(65) Prior Publication Data
US 2020/0402397 A1  Dec. 24, 2020

(30) Foreign Application Priority Data

Feb. 23, 2018  (JP) .............................. JP2018-030896

(51) Int. Cl.
*G08G 1/081* (2006.01)
*G01C 21/34* (2006.01)
(Continued)

(52) U.S. Cl.
CPC ......... *G08G 1/081* (2013.01); *G01C 21/3407* (2013.01); *G08G 1/0116* (2013.01); *G08G 1/09* (2013.01); *G08G 1/22* (2013.01)

(58) Field of Classification Search
CPC ........ G08G 1/081; G08G 1/0116; G08G 1/09; G08G 1/22; G01C 21/3407
See application file for complete search history.

(56) References Cited

U.S. PATENT DOCUMENTS 8,417,860 B2 * 4/2013 Choi ....................... H04L 67/12
 710/100
9,616,743 B1 * 4/2017 Mays .................... B60W 10/30
(Continued)

FOREIGN PATENT DOCUMENTS

JP  2005-071292 A  3/2005
JP  2010-211365 A  9/2010
(Continued)

*Primary Examiner* — Hussein Elchanti
(74) *Attorney, Agent, or Firm* — Oliff PLC

(57) ABSTRACT

A traffic signal control apparatus capable of controlling signal light colors at a target intersection and a downstream intersection, and includes: an acquisition unit configured to acquire a platoon length of platoon vehicles that are traveling on an inflow road of the target intersection, and an empty space length in a planned traveling route of the platoon vehicles; and a control unit configured to determine whether or not to control the signal light color at the downstream intersection corresponding to the planned traveling route of the platoon vehicles, according to a result of comparison between the platoon length and the empty space length.

9 Claims, 6 Drawing Sheets

(51) Int. Cl.
  *G08G 1/01* (2006.01)
  *G08G 1/09* (2006.01)
  *G08G 1/00* (2006.01)

(56) References Cited

U.S. PATENT DOCUMENTS

| | | | |
|---|---|---|---|
| 9,725,083 B2* | 8/2017 | Dextreit | B60W 30/16 |
| 2006/0155427 A1* | 7/2006 | Yang | G08G 1/081 |
| | | | 701/1 |
| 2007/0030212 A1* | 2/2007 | Shibata | G08G 1/162 |
| | | | 345/9 |
| 2010/0117861 A1* | 5/2010 | Free | G08G 1/07 |
| | | | 340/929 |
| 2010/0256852 A1* | 10/2010 | Mudalige | G08G 1/22 |
| | | | 701/24 |
| 2011/0068950 A1* | 3/2011 | Flaherty | G08G 1/096 |
| | | | 340/905 |
| 2014/0095058 A1* | 4/2014 | Patel | G08G 1/00 |
| | | | 701/117 |
| 2014/0236414 A1* | 8/2014 | Droz | G08G 1/166 |
| | | | 701/28 |
| 2016/0163200 A1* | 6/2016 | He | G08G 1/22 |
| | | | 701/117 |
| 2017/0036601 A1* | 2/2017 | Kimura | B60R 1/00 |
| 2017/0270785 A1 | 9/2017 | Umehara | |
| 2018/0188745 A1* | 7/2018 | Pilkington | G05D 1/0276 |

FOREIGN PATENT DOCUMENTS

| | | |
|---|---|---|
| JP | 2016-115123 A | 6/2016 |
| JP | 2016-177638 A | 10/2016 |
| JP | 2017-004370 A | 1/2017 |
| WO | WO-2016118117 A1 * | 7/2016 ............ H04W 48/18 |

\* cited by examiner

TRAFFIC SIGNAL CONTROL APPARATUS, TRAFFIC SIGNAL CONTROL METHOD, AND COMPUTER PROGRAM

TECHNICAL FIELD

The present invention relates to a traffic signal control apparatus, a traffic signal control method, and a computer program which are capable of controlling signal light colors at a target intersection and a downstream intersection.

This application claims priority on Japanese Patent Application No. 2018-030896 filed on Feb. 23, 2018, the entire contents of which are incorporated herein by reference.

BACKGROUND ART

Patent Literature 1 discloses a traffic signal control apparatus including: an acquisition unit that acquires positional information of a leading vehicle in a vehicle group consisting of a plurality of public vehicles traveling in platoon, and the length of the vehicle group; and a control unit capable of executing, based on the acquired information, preferential control for vehicle group which is preferential control for the entirety of the public vehicles forming the vehicle group.

The traffic signal control apparatus disclosed in Patent Literature 1 is capable of performing the preferential control that allows the vehicle group consisting of the plurality of public vehicles to preferentially pass through the intersection without dividing the vehicle group.

CITATION LIST

Patent Literature

PATENT LITERATURE 1: Japanese Laid-Open Patent Publication No. 2016-115123

SUMMARY OF INVENTION (1) An apparatus according to one aspect of the present disclosure is a traffic signal control apparatus capable of controlling signal light colors at a target intersection and a downstream intersection. The apparatus includes: an acquisition unit configured to acquire a platoon length of platoon vehicles that are traveling on an inflow road of the target intersection, and an empty space length in a planned traveling route of the platoon vehicles; and a control unit configured to determine whether or not to control the signal light color at the downstream intersection corresponding to the planned traveling route of the platoon vehicles, according to a result of comparison between the platoon length and the empty space length.

(5) A method according to one aspect of the present disclosure is a traffic signal control method for controlling signal light colors at a target intersection and a downstream intersection. The method includes: acquiring a platoon length of platoon vehicles that are traveling on an inflow road of the target intersection, and an empty space length in a planned traveling route of the platoon vehicles; and determining whether or not to control the signal light color at the downstream intersection corresponding to the planned traveling route of the platoon vehicles, according to a result of comparison between the platoon length and the empty space length.

(6) A computer program according to one aspect of the present disclosure is a computer program for causing a computer to function as a traffic signal control apparatus capable of controlling signal light colors at a target intersection and a downstream intersection. The computer program causes the computer to function as: an acquisition unit configured to acquire a platoon length of platoon vehicles that are traveling on an inflow road of the target intersection, and an empty space length in a planned traveling route of the platoon vehicles; and a control unit configured to determine whether or not to control the signal light color at the downstream intersection corresponding to the planned traveling route of the platoon vehicles, according to a result of comparison between the platoon length and the empty space length.

DESCRIPTION OF EMBODIMENTS

Figure 1:
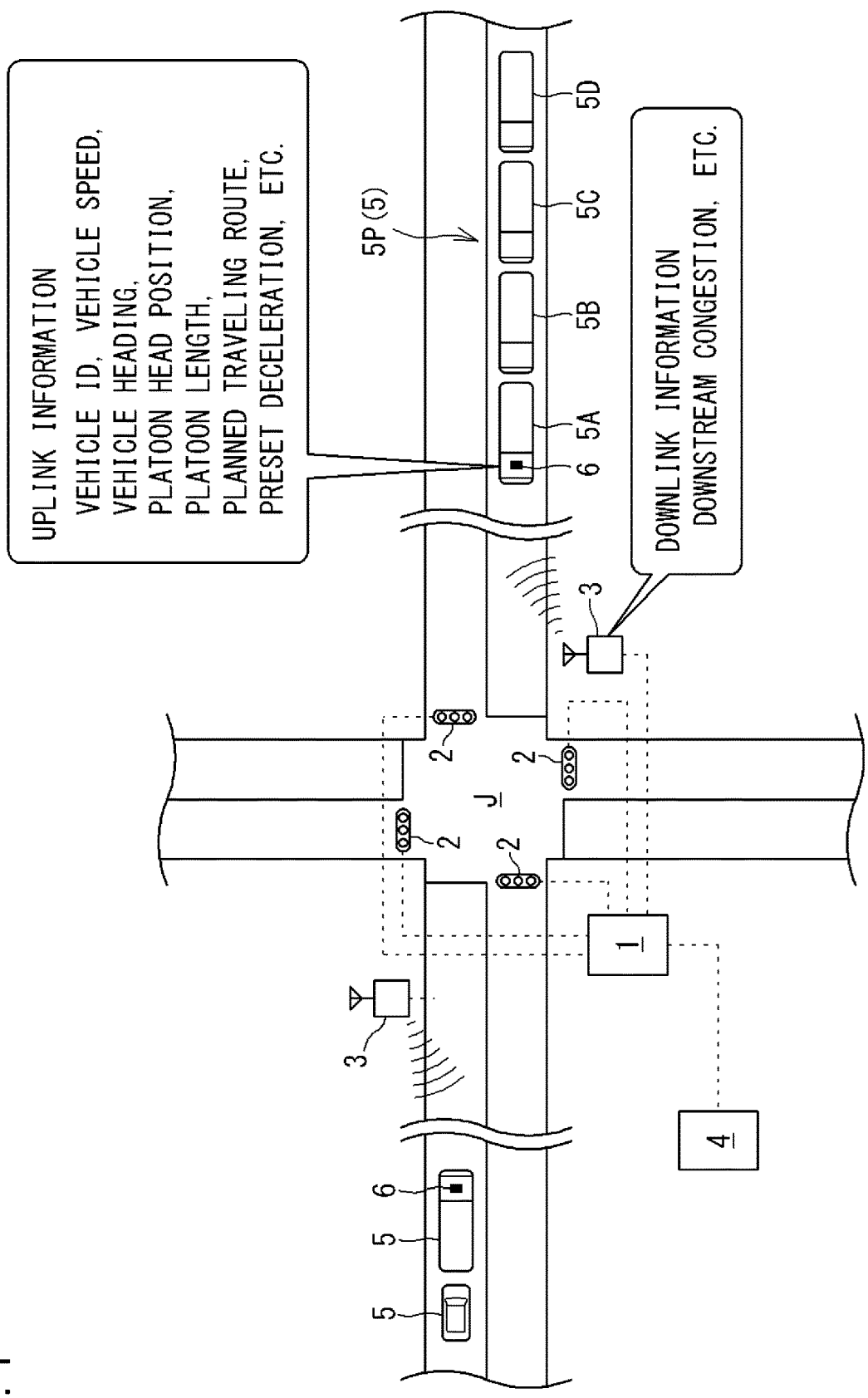
FIG. 1 is a road plan view showing an entire configuration of a traffic signal control system.

<Problems to be Solved by the Present Disclosure>

If there is downstream congestion in a planned traveling route in which a plurality of vehicles traveling in platoon (hereinafter referred to as "platoon vehicles") will travel after passing through an intersection, the platoon vehicles that become unable to pass through the intersection are likely to block the traffic on the intersecting road of the intersection. Patent Literature 1 does not describe a control method for avoiding adverse effects of such downstream congestion.

An object of the present disclosure is to provide a traffic signal control apparatus and the like capable of avoiding a situation that platoon vehicles become unable to pass through an intersection due to downstream congestion present in a planned traveling route of the platoon vehicles.

<Effects of the Present Disclosure>

According to the present disclosure, it is possible to avoid a situation that platoon vehicles become unable to pass through an intersection due to downstream congestion present in a planned traveling route of the platoon vehicles.

<Outline of Embodiment of the Present Disclosure>

Hereinafter, the outline of an embodiment of the present invention will be listed and described.

(1) A traffic signal control apparatus according to the present embodiment is a traffic signal control apparatus capable of controlling signal light colors at a target intersection and a downstream intersection, and the apparatus includes: an acquisition unit configured to acquire a platoon length of platoon vehicles that are traveling on an inflow road of the target intersection, and an empty space length in a planned traveling route of the platoon vehicles; and a control unit configured to determine whether or not to control the signal light color at the downstream intersection corresponding to the planned traveling route of the platoon vehicles, according to a result of comparison between the platoon length and the empty space length.

According to the traffic signal control apparatus of the present embodiment, the control unit determines whether or not to control the signal light color at the downstream intersection corresponding to the planned traveling route of the platoon vehicles, according to the result of comparison between the platoon length and the empty space length, Therefore, it is possible to avoid a situation that the platoon vehicles become unable to pass through the target intersection due to downstream congestion present in the planned traveling route.

(2) Specifically, when the platoon length is longer than the empty space length, the control unit changes the signal light color, at the downstream intersection, corresponding to the planned traveling route of the platoon vehicles to a light color indicating right-of-way, on condition that the signal light color corresponding to the planned traveling route of the platoon vehicles is a light color indicating no right-of-way.

In this case, when the cause of downstream congestion is vehicles waiting for a signal change at the downstream intersection, the downstream congestion can be eliminated early, thereby allowing the platoon vehicles to pass through the target intersection.

(3) In the traffic signal control apparatus of the present embodiment, when the platoon length is longer than the empty space length, the control unit preferably changes a signal light color in a platoon-vehicle inflow direction at the target intersection to a light color indicating right-of-way, on condition that the signal light color in the platoon-vehicle inflow direction is a light color indicating no right-of-way.

In this case, it is possible to prevent another vehicle present on an intersecting road of the target intersection from entering the planned traveling route, thereby preventing the promotion of downstream congestion.

(4) In the traffic signal control apparatus of the present embodiment, the control unit preferably notifies the platoon vehicles of presence/absence of downstream congestion in the planned traveling route of the platoon vehicles, according to the result of comparison between the platoon length and the empty space length.

In this case, a driver of the platoon vehicles can perceive presence/absence of downstream congestion in the planned traveling route before the platoon vehicles pass through the target intersection. Thus, the driver of the platoon vehicles can appropriately determine whether or not the platoon vehicles can pass through the target intersection.

(5) A traffic signal control method of the present embodiment is a control method executed by the traffic signal control apparatus according to the above (1) to (4).

Therefore, traffic signal control method of the present embodiment exhibits effects similar to those of the traffic signal control apparatus according to the above (1) to (4).

(6) A computer program of the present embodiment is a program that causes a computer to function as the traffic signal control apparatus according to the above (1) to (4).

Therefore, the computer program of the present embodiment exhibits effects similar to those of the traffic signal control apparatus according to the above (1) to (4).

<Details of Embodiment of the Present Disclosure>

Hereinafter, an embodiment of the present disclosure will be described in detail with reference to the drawings. At least some parts of the embodiment described below may be combined as desired.

In the present embodiment, light colors of signal light units comply with Japanese laws. Therefore, the light colors of the signal light units include green (in actuality, blue green), yellow, and red.

Green means that a vehicle can go straight ahead, turn left, and turn right at an intersection. Yellow means that a vehicle should not advance over a stop position (excluding a case where the vehicle cannot safely stop at the stop position). Red means that a vehicle should not advance over a stop position.

Therefore, green is a light color indicating that a vehicle traveling on an inflow road of an intersection has right-of-way at the intersection. Red is a light color indicating that the vehicle traveling on the inflow road of the intersection does not have right-of-way at the intersection. Yellow is a light color indicating that the vehicle does not have right-of-way in principle, but has right-of-way only when the vehicle cannot safely stop at the stop position.

In some countries, the light color indicating right-of-way (blue in Japanese language) is expressed as green. Meanwhile, in some countries, the light color indicating no right-of-way in principle (yellow in Japan) is expressed as orange or amber.

(Overall Configuration of System)

FIG. 1 is a road plan view showing the overall configuration of a traffic signal control system according to the present embodiment.

As shown in FIG. 1, the traffic signal control system of the present embodiment includes a traffic signal controller 1, signal light units 2, roadside communication apparatuses 3, a central apparatus 4, on-vehicle devices 6 mounted on vehicles 5, etc.

The vehicles 5 include platoon vehicles 5P consisting of a plurality of (four in the example of FIG. 1) vehicles 5A to 5D traveling in platoon with a short inter-vehicle distance.

The vehicles 5A to 5D are not limited to large vehicles such as trucks and buses, and may be passenger cars such as taxies. The platoon vehicles 5P may be a combination of different types of vehicles 5A to 5D.

The following vehicles 5B and 5C can follow the preceding vehicles with a strict inter-vehicle distance according to CACC (Cooperative Adaptive Cruise Control).

In the present embodiment, it is assumed that the leading vehicle 5A of the platoon vehicles 5P is a manned vehicle while the following vehicles 5B to 5D are unmanned vehicles. However, the following vehicles 5B to 5D may be manned vehicles.

The traffic signal controller 1 is connected to a plurality of signal light units 2 installed at an intersection J via power lines. The traffic signal controller 1 is connected to the central apparatus 4 installed in a traffic control center or the like via a dedicated communication line.

The central apparatus 4 constructs a local area network with traffic signal controllers 1 installed at a plurality of intersections J within an area that the central apparatus 4 covers. Therefore, the central apparatus 4 is communicable with a plurality of traffic signal controllers 1, and each traffic signal controller 1 is communicable with the controllers 1 at other intersections J.

The central apparatus 4 receives, in each predetermined cycle (e.g., 1 min), sensor information measured by roadside sensors such as vehicle detectors and image sensors 7 (see FIG. 5 and FIG. 6), and calculates, in each predetermined cycle (e.g., 2.5 min), a traffic index such as link travel time, based on the received sensor information.

The central apparatus 4 can perform traffic actuated control in which signal control parameters (split, cycle length, offset, and the like) at each intersection J are adjusted based on the calculated traffic index.

The central apparatus 4 can execute, for the traffic signal controllers 1 that belong to its coverage area, a coordinated control of adjusting offsets of a plurality of intersections J included in a coordinated section, and a wide-area control (area traffic control) in which the coordinated control is expanded onto a road network, for example.

The central apparatus 4 may notify the traffic signal controllers in its coverage area of control type information including whether or not local actuated control at a specific intersection J is permitted.

When identification information that permits the local actuated control is included in the control type information received from the central apparatus 4, the traffic signal controller 1 executes a predetermined local actuated control such as PTPS (Public Transportation Priority System) for the intersection J in charge of the controller 1.

Based on the signal control parameters received from the central apparatus 4, the traffic signal controller 1 controls turn-on, turn-off, blinking, etc., of the signal light units 2. When executing the local actuated control, the traffic signal controller 1 can switch the light colors of the signal light units 2 according to the result of the control.

The traffic signal controller 1 is connected to the roadside communication apparatus 3 via a predetermined communication line. Therefore, the traffic signal controller 1 also functions as a relay device for communication between the central apparatus 4 and the roadside communication apparatus 3.

The roadside communication apparatus 3 is a middle-to-wide range wireless communication device based on a predetermined communication standard such as ITS (Intelligent Transport Systems) wireless system, wireless LAN, or LTE (Long Term Evolution). Therefore, the roadside communication apparatus 3 is wirelessly communicable with the on-vehicle devices 6 of the vehicles 5 traveling on the road.

The roadside communication apparatus 3 wirelessly transmits downlink information to the on-vehicle devices 6. The roadside communication apparatus 3 can include, in the downlink information, traffic jam information generated by the central apparatus 4, traffic signal information (signal light color switching information) generated by the traffic signal controller 1, etc.

Each on-vehicle device 6 receives the downlink information from the roadside communication apparatus 3 when the on-vehicle device 6 enters a communication area of the roadside communication apparatus 3 (e.g., an area within about 300 m upstream from the intersection J).

The on-vehicle device 6 transmits uplink information to the roadside communication apparatus 3 in a predetermined transmission cycle (e.g., 100 ms). The uplink information includes, for example, probe data indicating the travel locus of the vehicle 5. The probe data includes vehicle ID, data generation time, vehicle position, vehicle speed, vehicle heading, etc.

The roadside communication apparatus 3 can also include, in the downlink information, a message regarding presence/absence of downstream congestion in a planned traveling route of the platoon vehicles 5P, as provision information directed to the platoon vehicles 5P. In the present embodiment, the central apparatus 4 generates the message regarding presence/absence of downstream congestion.

The probe data transmitted from the on-vehicle device 6 of the platoon vehicles 5P includes vehicle ID, vehicle speed, and vehicle heading of the leading vehicle 5A, platoon head position (position of the front end of the leading vehicle 5A), platoon length, planned traveling route, preset deceleration (constant), etc.

The platoon length is, for example, the length from the platoon head position (position of the front end of the leading vehicle 5A) to a convoy tail position (position of the rear end of the tail-end vehicle 5D). The platoon length may be the length from the platoon head position to the position of the front end of the tail-end vehicle 5D.

The on-vehicle device 6 of the leading vehicle 5A specifies the number of vehicles (four in FIG. 1) included in the platoon vehicles 5P, based on the number of the following vehicles 5B to 5D that perform vehicle-to-vehicle communication with the vehicle 5A, and calculates the platoon length based on the specified number of vehicles, the length of each vehicle, and the inter-vehicle distance. The on-vehicle device 6 includes the value of the calculated platoon length in the probe data.

The planned traveling route is information indicating which route the platoon vehicles 5P will take after having passed through the intersection J. The planned traveling route is, for example, identification information of a road link connected to the intersection J.

The on-vehicle device 6 of the leading vehicle 5A performs map matching of a planned traveling path calculated by a navigation device (not shown) of the leading vehicle 5A, with road map data, to identify the road link after passing through the intersection J, and includes identification information of the road link in the probe data.

The preset deceleration is a representative value (e.g., average value) of deceleration from when a brake starts to work to when the vehicle 5 safely stops. Generally, the heavier the vehicle 5 is, the harder it is for the vehicle 5 to smoothly come to a stop.

Therefore, when the vehicles included in the platoon vehicles 5P are cargo vehicles such as trucks, different values of preset decelerations may be adopted according to the loads thereof. In this case, for example, the value of preset deceleration may be gradually decreased for a vehicle that is heavily loaded.

[Structure of Traffic Signal Controller]

Figure 2:
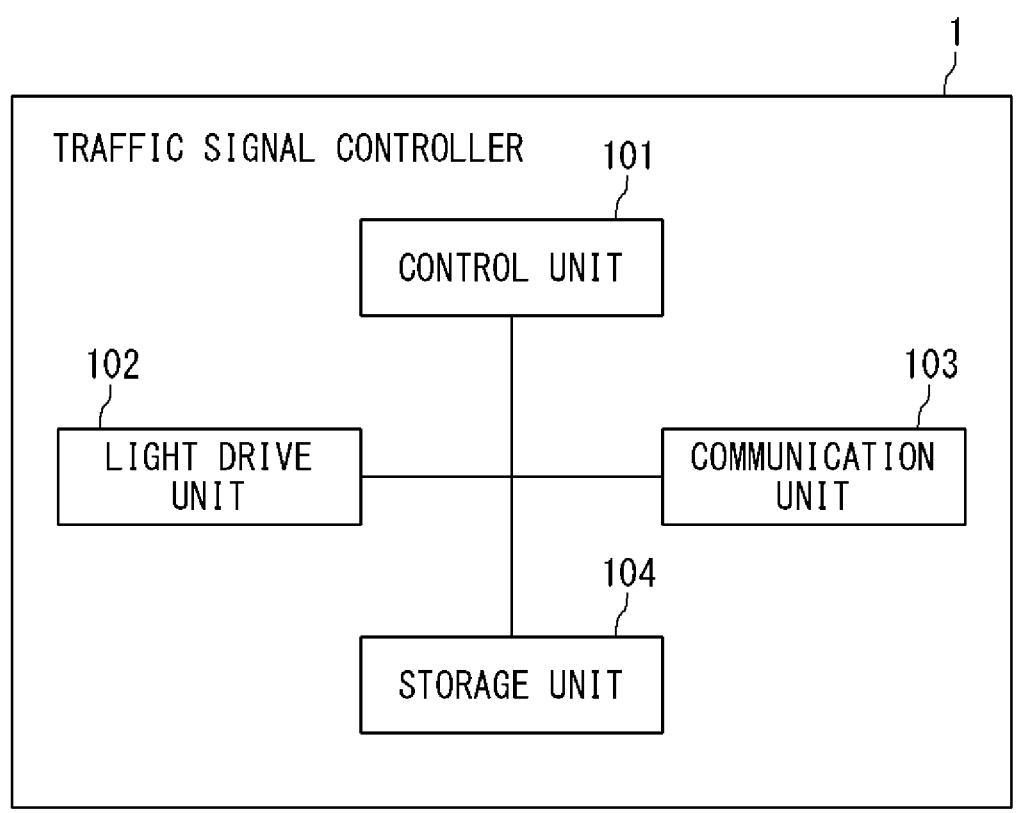
FIG. 2 is a block diagram showing an example of an internal structure of a traffic signal controller.

FIG. 2 is a block diagram showing an example of an internal structure of the traffic signal controller 1.

As shown in FIG. 2, the traffic signal controller 1 includes a control unit 101, a light drive unit 102, a communication unit 103, and a storage unit 104.

The control unit 101 is implemented by one or a plurality of microcomputers, and is connected to the light drive unit 102, the communication unit 103, and the storage unit 104 via an internal bus. The control unit 101 controls the operations of these hardware units.

The control unit 101 usually determines a light color switching timing of each signal light unit 2 in accordance with the signal control parameters that are determined by the central apparatus 4 based on the traffic actuated control.

When the local actuated control is permitted by the control type information from the central apparatus 4, the control unit 101 may determine a light color switching timing of each signal light unit 2 in accordance with the result of the local actuated control performed in the traffic signal controller 1.

The light drive unit 102 includes a semiconductor relay (not shown), and turns on/off an AC voltage (AC 100 V) or a DC voltage that is supplied to each of signal lights of the signal light unit 2, based on the signal switching timing determined by the control unit 101.

The communication unit 103 is a communication interface that performs wired communication with the central apparatus 4 and the roadside communication apparatus 3. Upon receiving the signal control parameters from the central apparatus 4, the communication unit 103 transmits the parameters to the control unit 101. Upon receiving the provision information directed to vehicles from the central apparatus 4, the communication unit 103 transmits the provision information to the roadside communication apparatus 3.

The communication unit 103 receives the probe data of the vehicles 5 including the platoon vehicles 5P from the roadside communication apparatus 3 almost in real time (e.g., at intervals of 0.1 to 1.0 sec).

The storage unit 104 is implemented by a storage medium such as a hard disk or a semiconductor memory. The storage unit 104 temporarily stores therein various kinds of information (signal control parameters, probe data, etc.) received by the communication unit 103.

The storage unit 104 also stores therein a computer program that allows the control unit 101 to realize local actuated control, etc.

[Structure of Central Apparatus]

Figure 3:
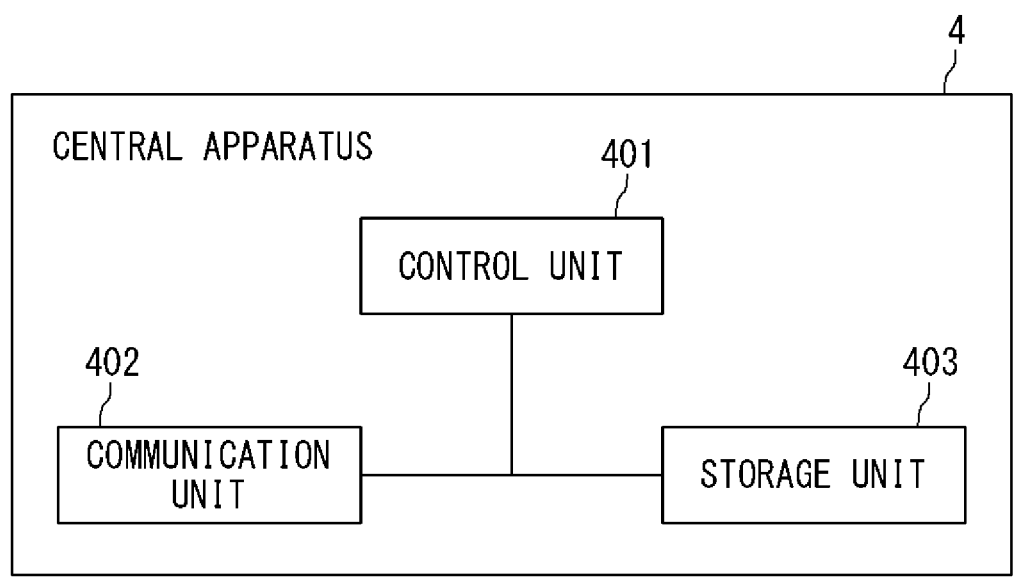
FIG. 3 is a block diagram showing an example of an internal structure of a central apparatus.

FIG. 3 is a block diagram showing an example of the internal structure of the central apparatus 4.

As shown in FIG. 3, the central apparatus 4 includes a control unit 401, a communication unit (acquisition unit) 402, and a storage unit 403.

The control unit 401 is implemented by a work station (WS), a personal computer (PC), or the like. The control unit 401 collects various kinds of information from the traffic signal controller 1 and the roadside communication apparatus 3, processes (operates) and stores the information, and comprehensively performs signal control, information provision, etc.

The control unit 401 is connected to the aforementioned hardware units via an internal bus, and controls the operations of these units.

The communication unit 402 is a communication interface that is connected to the LAN side via a communication line. The communication unit 402 transmits the signal control parameters of the signal light units 2 at the intersection J to the traffic signal controller 1 in each predetermined cycle (e.g., 1.0 to 2.5 min).

The communication unit 402 receives, from the traffic signal controller 1, the probe data which is acquired by the roadside communication apparatus 3 and is necessary for traffic actuated control (central actuated control) to be performed by the central apparatus 4. The communication unit 402 transmits the signal control parameters, the control type information, etc., to the traffic signal controller 1.

In the example of FIG. 1, the communication unit 402 of the central apparatus 4 receives, via the traffic signal controller 1, the probe data that is uplink-transmitted from the roadside communication apparatus 3. However, the communication unit 402 may receive the probe data through direct communication with the roadside communication apparatus 3.

The communication unit 402 functions as an acquisition unit for acquiring information (platoon length, planned traveling route, etc.) necessary for generating provision information to the platoon vehicles 5P.

Figure 4:
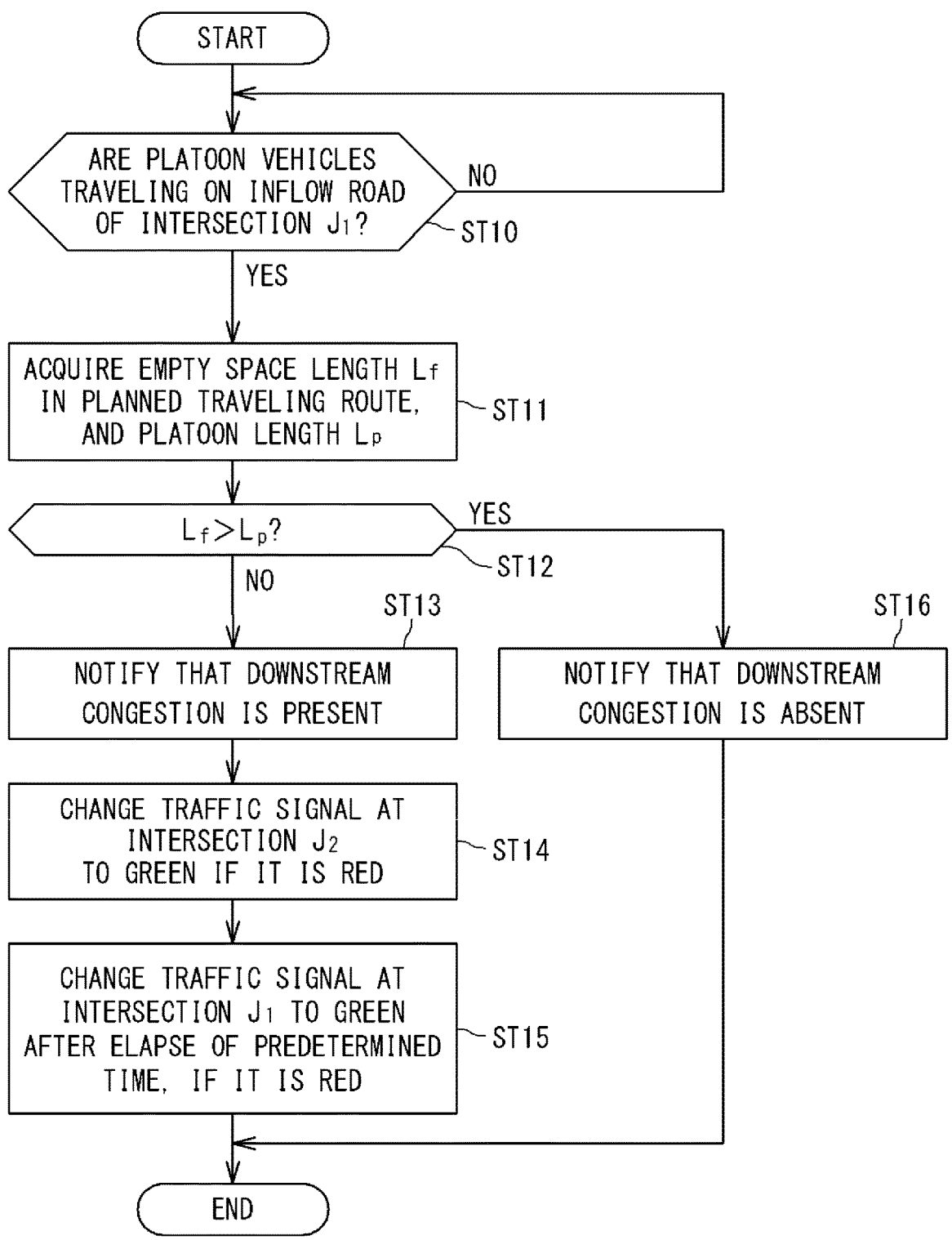
FIG. 4 is a flowchart showing an example of downstream congestion avoiding control.

The storage unit 403 is implemented by a hard disk, a semiconductor memory, or the like, and stores therein a computer program that executes downstream congestion avoiding control described below (FIG. 4).

The storage unit 403 stores therein information necessary for executing the downstream congestion avoiding control, such as step information including signal light colors for steps and the number of seconds for each step, and the position of the intersection J.

The storage unit 403 temporarily stores therein the signal control parameters generated by the control unit 401, the probe data received from the roadside communication apparatus 3, etc.

The control unit 401 reads out the aforementioned computer program from the storage unit 403 and performs information processing, thereby executing "downstream congestion avoiding control" for avoiding a situation that the platoon vehicles 5P cannot pass through an intersection J1 due to downstream congestion present in a planned traveling route of the platoon vehicles 5P. Hereinafter, the content of this control will be described.

[Downstream Congestion Avoiding Control]

FIG. 4 is a flowchart showing an example of the downstream congestion avoiding control.

In FIG. 4, an "intersection J1" is a target intersection for which the downstream congestion avoiding control is performed, and an "intersection J2" is a downstream intersection that is present adjacently downstream of the intersection J1. The intersection J2 may be a single intersection or a series of intersections.

As shown in FIG. 4, the control unit 401 of the central apparatus 4 executes processes in step ST11 and subsequent steps, on condition that the platoon vehicles 5P are traveling on an inflow road of the intersection J1 (step ST10). The term "traveling" includes a case where the platoon vehicles 5P are stopped before the intersection J1.

Whether or not the platoon vehicles 5P are traveling on the inflow road of the intersection J1 can be determined based on, for example, the vehicle position, the vehicle speed, the vehicle heading, etc., of the leading vehicle 5A.

When the platoon vehicles 5P are traveling on the inflow road of the intersection J1, the control unit 401 acquires an empty space length Lf in the planned traveling route of the platoon vehicles 5P, and a platoon length Lp of the platoon vehicles 5P (step ST11). Specifically, the control unit 401 extracts the planned traveling route and the platoon length Lp of the platoon vehicles 5P from probe data transmitted from the leading vehicle 5A.

Further, the control unit 401 calculates the empty space length Lf in the planned traveling route, based on image data received from the image sensor 7 (FIG. 5 and FIG. 6) installed near the intersection J1.

Next, the control unit 401 determines whether or not the empty space length Lf in the planned traveling route is longer than the platoon length Lp of the platoon vehicles 5P (step ST12).

When the determination result in step ST12 is positive, the control unit 401 generates a "first message" informing that downstream congestion is absent, and transmits the first message to the roadside communication apparatus 3 (step ST16). Therefore, the first message is downlink-transmitted by the roadside communication apparatus 3.

Upon receiving the first message, the on-vehicle device 6 of the leading vehicle 5A notifies the driver of the content of the first message through a display device or a voice output device in the vehicle 5A.

Thus, the driver of the leading vehicle 5A can perceive the traffic situation in which passing of the platoon vehicles 5P through the intersection J1 will not be impeded by downstream congestion, in advance before the intersection J1.

When the determination result in step ST12 is positive, the control unit 401 ends the processing without executing steps ST14 and ST15 described later.

When the determination result in step ST12 is negative, the control unit 401 generates a "second message" informing that downstream congestion is present, and transmits the second message to the roadside communication apparatus 3 (step ST13). Therefore, the second message is downlink-transmitted by the roadside communication apparatus 3.

Upon receiving the second message, the on-vehicle device 6 of the leading vehicle 5A notifies the driver of the content of the second message through the display device or the voice output device in the vehicle 5A.

Thus, the driver of the leading vehicle 5A can perceive the traffic situation in which passing of the platoon vehicles 5P through the intersection J1 will be impeded by downstream congestion, in advance before the intersection J1.

When the determination result in step ST12 is negative, the control unit 401 changes the intersection J2 to green light, on condition that the intersection J2 shows red light (step ST14). Specifically, the control unit 401 instructs the traffic signal controller 1 at the intersection J2 to change the signal light color in the direction in which the planned traveling route of the platoon vehicles 5P is on the inflow side, to green.

Thus, if the cause of the downstream congestion is vehicles waiting for a signal change at the intersection J2, this downstream congestion can be eliminated early.

When the determination result in step ST12 is negative, the control unit 401 changes the intersection J1 to green light, on condition that the intersection J1 shows red light (step ST15). Specifically, the control unit 401 instructs the traffic signal controller 1 at the intersection J1 to change the signal light color in the inflow direction of the platoon vehicles 5P to green.

Thus, another vehicle 5 present on the intersecting road of the intersection J1 is prevented from entering the planned traveling route, thereby preventing the promotion of the downstream congestion.

[Specific Examples of Change in Traffic Situation]

Figure 5:
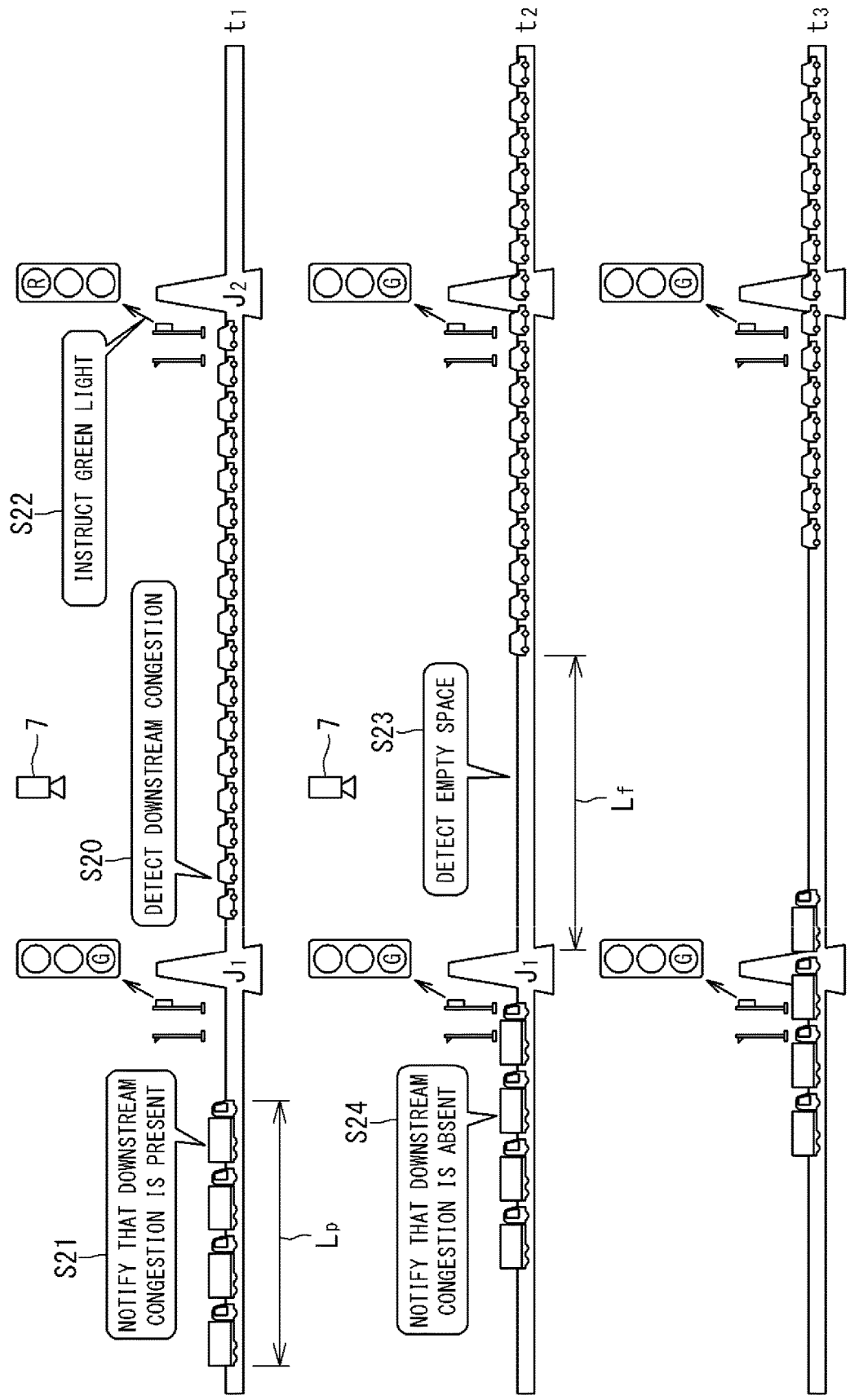
FIG. 5 illustrates an example of change in traffic situation due to downstream congestion avoiding control.

FIG. 5 illustrates an example of change in the traffic situation due to downstream congestion avoiding control.

In the example of FIG. 5, the platoon vehicles 5P are traveling rightward toward the target intersection J1, and the planned traveling route of the platoon vehicles 5P is in the straight-ahead direction. At time t1, the target intersection J1 shows "green light", and the downstream intersection J2 shows "red light".

As shown in FIG. 5, when the empty space Lf of the planned traveling route is shorter than the platoon length Lp (step S20: detect downstream congestion), the control unit 401 of the central apparatus 4 notifies the platoon vehicles 5P that downstream congestion is present (step S21). Thus, the platoon vehicles 5P stop before the target intersection J1 even though the intersection J1 shows green light.

Upon detecting the downstream congestion (step S20), the control unit 401 of the central apparatus 4 controls the downstream intersection J2 so as to change the red light to green light (step S22). Thus, the downstream congestion caused by vehicles waiting for a signal change at the downstream intersection J2 starts to be gradually decreased.

At time t2 after a predetermined time has elapsed from time t1, if the empty space Lf is longer than the platoon length Lp (step S23: detect empty space), the control unit 401 of the central apparatus 4 notifies the platoon vehicles 5P that downstream congestion is absent (step S24).

Thus, at time t3 after a predetermined time has passed from time t2, the platoon vehicles 5P start to pass through the target intersection J1 and travel toward the downstream intersection J2.

Figure 6:
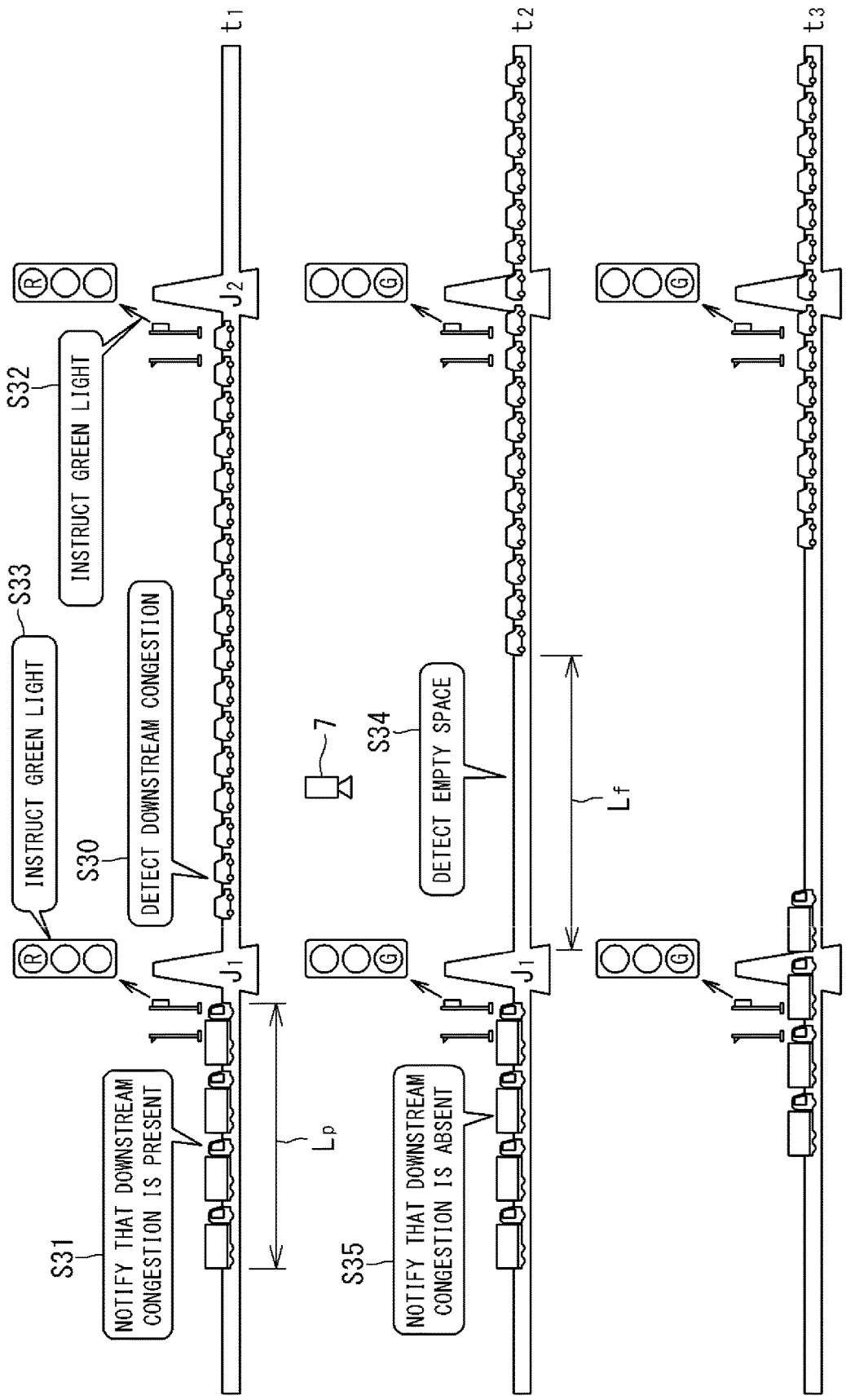
FIG. 6 illustrates another example of change in traffic situation due to downstream congestion avoiding control.

FIG. 6 shows another example of change in the traffic situation due to downstream congestion avoiding control.

In the example of FIG. 6, the platoon vehicles 5P are stopped at the stop line of the target intersection J1, and the planned traveling route of the platoon vehicles 5P is in the straight-ahead direction. At time t1, the target intersection J1 shows "red light", and the downstream intersection J2 shows "red light".

As shown in FIG. 6, when the empty space Lf in the planned traveling route is shorter than the platoon length Lp (step S30: detect downstream congestion), the control unit 401 of the central apparatus 4 notifies the platoon vehicles 5P that downstream congestion is present (step S31). Thus, the platoon vehicles 5P remain stopped before the target intersection J1 even when the red light has changed to green light immediately after time t1.

Upon detecting the downstream congestion (step S30), the control unit 401 of the central apparatus 4 controls the downstream intersection J2 so as to change the red light to green light (step S32). Thus, the downstream congestion caused by vehicles waiting for a signal change at the downstream intersection J2 starts to be gradually decreased.

Upon detecting the downstream congestion (step S30), the control unit 401 of the central apparatus 4 also controls the target intersection J1 so as to change the red light to green light (step S33).

Thus, a vehicle 5 present on the intersecting road of the target intersection J1 becomes unable to enter the planned traveling route of the platoon vehicles 5P, thereby preventing the downstream congestion in the planned traveling route from being promoted.

At time t2 after a predetermined time has passed from time t1, if the empty space Lf is longer than the platoon length Lp (step S34: detect empty space), the control unit 401 of the central apparatus 4 notifies the platoon vehicles 5P that downstream congestion is absent (step S35).

Thus, at time t3 after elapse of a predetermined time from time t2, the platoon vehicles 5P start to pass through the target intersection J1 and travel toward the downstream intersection J2.

[Modifications]

The embodiment (including modifications) disclosed herein is merely illustrative and not restrictive in all aspects. The scope of the present disclosure is not limited to the embodiment described above, and includes all changes which come within the scope of equivalency of configurations described in the claims.

In the aforementioned embodiment, the control unit 401 of the central apparatus 4 executes the downstream congestion avoiding control (FIG. 4). However, any of other roadside devices such as the traffic signal controller 1 and the roadside communication apparatus 3 may execute the downstream congestion avoiding control.

That is, a control device for executing the downstream congestion avoiding control may be any of the central apparatus 4, the traffic signal controller 1, and the roadside communication apparatus 3.

In the aforementioned embodiment, the traffic signal controller 1, the central apparatus 4, and the on-vehicle device 6 each may have a communication function based on the fifth-generation mobile communication system (5G).

In this case, if the central apparatus 4 is an edge server that has less delay than a core server, delay in communication between the central apparatus 4 and the on-vehicle device 6 can be reduced. This allows the central apparatus 4 to execute, based on probe data, traffic signal control with improved real-time property.

In the above embodiment, the planned traveling route of the platoon vehicles 5P is in the straight-ahead direction, that is, the inflow road and the planned traveling route of the platoon vehicles 5P are in the same direction. However, the present disclosure is not limited thereto.

Specifically, the planned traveling route of the platoon vehicles 5P may be in a direction intersecting the inflow road on which the platoon vehicles 5P travel (e.g., left-turn direction or right-turn direction).

REFERENCE SIGNS LIST 1 traffic signal controller (traffic signal control apparatus)
2 signal light unit
3 roadside communication apparatus (traffic signal control apparatus)
4 central apparatus (traffic signal control apparatus)
5 vehicle
5A leading vehicle
5B to 5D following vehicles
5P platoon vehicles
6 on-vehicle device
7 image sensor
101 control unit
102 light drive unit
103 communication unit
104 storage unit
401 control unit
402 communication unit (acquisition unit)
403 storage unit

The invention claimed is:

1. A traffic signal control apparatus capable of controlling signal light colors at a target intersection and a downstream intersection located on a downstream side of the target intersection, comprising:
 a communication interface configured to acquire a platoon length of platoon vehicles that are traveling on an inflow road located on an upstream side of the target intersection, and a planned traveling route of the platoon vehicles; and
 a processor connected to an image sensor and the communication interface, the processor being programed to
  calculate an empty space length located on a downstream side of the platoon vehicles in the planned traveling route based on image data received from the image sensor; and
  determine whether or not to control the signal light color at the downstream intersection corresponding to the planned traveling route of the platoon vehicles, according to a result of comparison between the platoon length and the empty space length.

2. The traffic signal control apparatus according to claim 1, wherein
 when the platoon length is longer than the empty space length,
 the processor changes the signal light color, at the downstream intersection, corresponding to the planned traveling route of the platoon vehicles to a light color indicating right-of-way, on condition that the signal light color corresponding to the planned traveling route of the platoon vehicles is a light color indicating no right-of-way.

3. The traffic signal control apparatus according to claim 1, wherein
 when the platoon length is longer than the empty space length,
 the processor changes a signal light color in a platoon-vehicle inflow direction at the target intersection to a signal light color indicating right-of-way, on condition that the signal light color in the platoon-vehicle inflow direction is a light color indicating no right-of-way.

4. The traffic signal control apparatus according to claim 1, wherein the processor notifies the platoon vehicles of presence/absence of downstream congestion in the planned traveling route of the platoon vehicles, according to the result of comparison between the platoon length and the empty space length.

5. The traffic signal control apparatus according to claim 1, wherein
 the traffic signal control apparatus is any one of a central apparatus, a traffic signal controller, and a roadside communication apparatus having a communication function based on a fifth-generation mobile communication system (5G), and
 the central apparatus is an edge server that has less delay than a core server.

6. The traffic signal control apparatus according to claim 1, wherein
 the planned traveling route of the platoon vehicles intersects the inflow road on which the platoon vehicles travel.

7. The traffic signal control apparatus according to claim 1, wherein
 when the empty space length is shorter than the platoon length, the processor notifies the platoon vehicle that downstream congestion is present, and
 when the empty space length becomes longer than the platoon length after notification about presence of the downstream congestion, the processor notifies the platoon vehicle that downstream congestion is absent.

8. A traffic signal control method for controlling signal light colors at a target intersection and a downstream intersection located on a downstream side of the target intersection, the method comprising:
 acquiring, using a communication interface, a platoon length of platoon vehicles that are traveling on an inflow road located on an upstream side of the target intersection, and a planned traveling route of the platoon vehicles;
 calculating, using a processor connected to an image sensor and the communication interface, an empty space length located on a downstream side of the platoon vehicles in the planned traveling route based on image data received from the image sensor; and
 determining, using the processor, whether or not to control the signal light color at the downstream intersection corresponding to the planned traveling route of the platoon vehicles, according to a result of comparison between the platoon length and the empty space length.

9. A non-transitory computer readable storage medium storing a computer program for causing a computer, including a processor connected to an image sensor and a communication interface, to function as a traffic signal control apparatus capable of controlling signal light colors at a target intersection and a downstream intersection located on a downstream side of the target intersection, the computer program causing the computer to:
 acquire, using the communication interface, a platoon length of platoon vehicles that are traveling on an inflow road located on an upstream side of the target intersection, and a planned traveling route located on a downstream side of the platoon vehicles;
 calculate, using the processor, an empty space length located on a downstream side of the platoon vehicles in the planned traveling route based on image data received from the image sensor; and determine, using the processor, whether or not to control the signal light color at the downstream intersection corresponding to the planned traveling route of the platoon vehicles, according to a result of comparison between the platoon length and the empty space length.

* * * * *